UNITED STATES PATENT OFFICE.

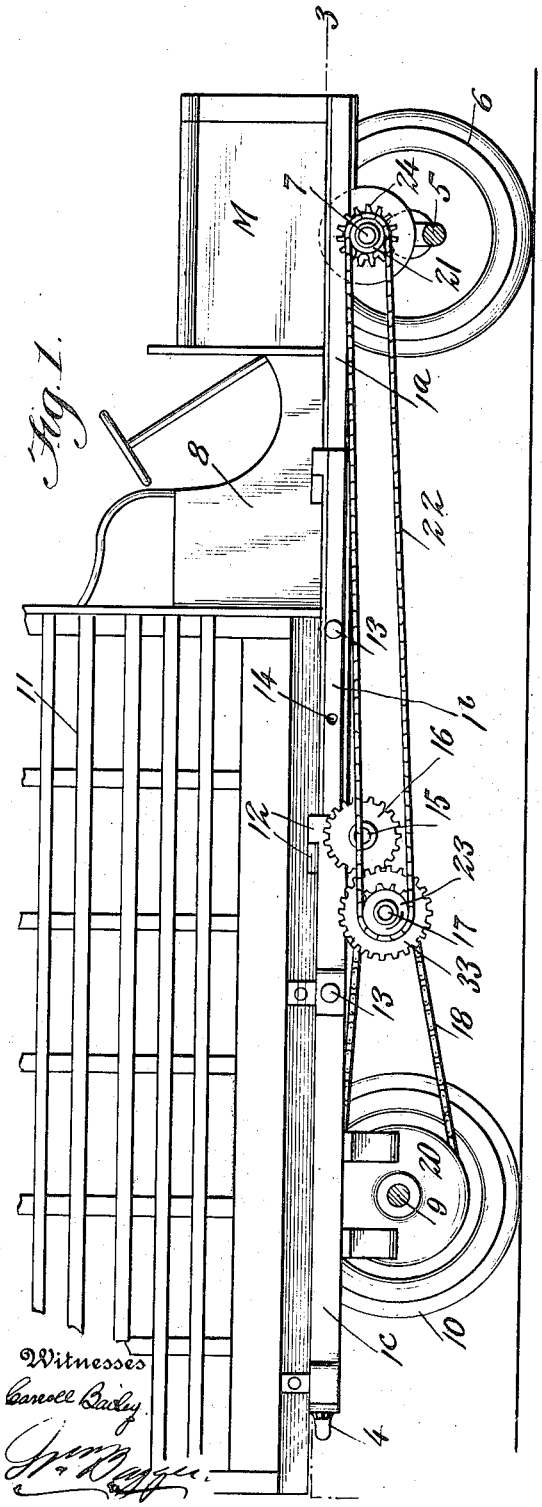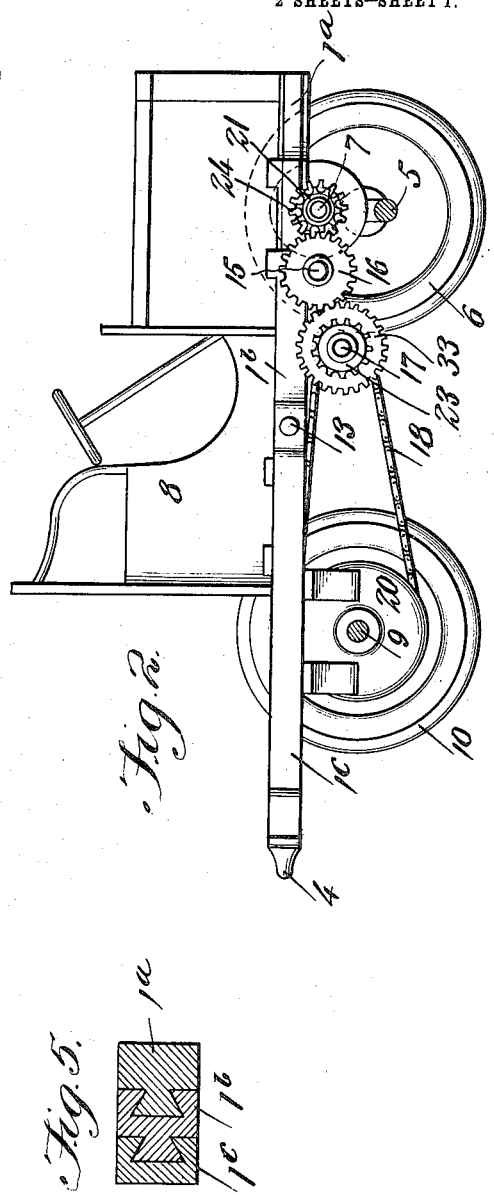

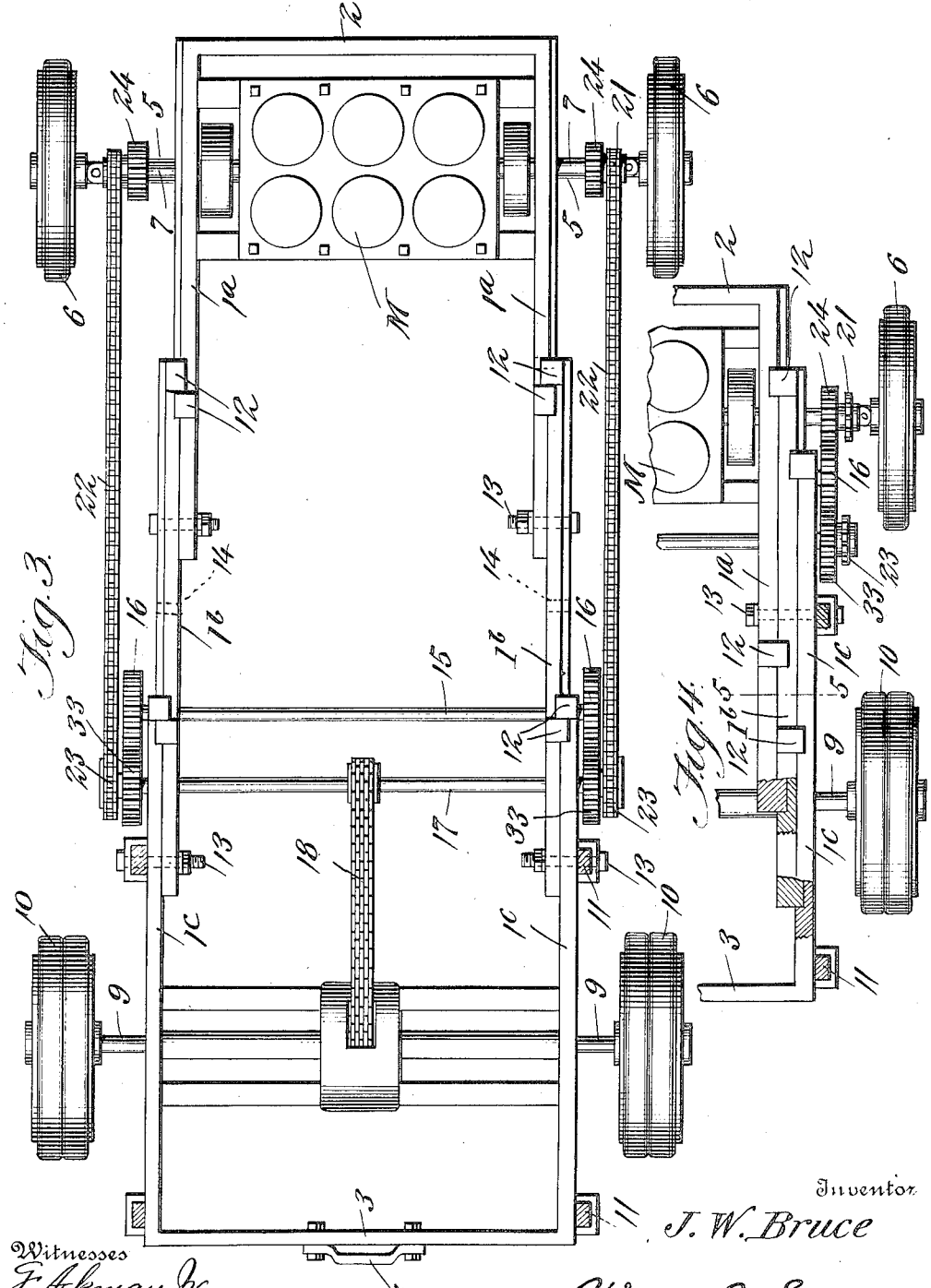

JAMES WESLEY BRUCE, OF OZARK, OHIO.

MOTOR-VEHICLE.

1,075,088.  Specification of Letters Patent.  Patented Oct. 7, 1913.

Application filed September 17, 1912. Serial No. 720,383.

*To all whom it may concern:*

Be it known that I, JAMES W. BRUCE, a citizen of the United States, residing at Ozark, in the county of Monroe and State of Ohio, have invented new and useful Improvements in Motor-Vehicles, of which the following is a specification.

This invention relates to motor vehicles, and the principal object of the invention is to produce a motor vehicle of simple and compact construction which may be conveniently employed for general farm and traction use, as well as for the conveyance of passengers.

A further object of the invention is to produce a motor vehicle of simple and efficient construction having a collapsible frame and which may be employed when needed to support a wagon box, hay rack or other like receptacle for the transportation of various commodities.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings, Figure 1 is a side elevation of a motor vehicle constructed in accordance with the invention, showing the same with the frame extended and supporting a hay rack. Fig. 2 is a side elevation showing the vehicle frame collapsed. Fig. 3 is a horizontal sectional view taken on the line 3—3 in Fig. 1. Fig. 4 is a horizontal sectional view taken on the same plane, but showing the vehicle frame collapsed. Fig. 5 is a sectional detail view taken on the line 5—5 in Fig. 4.

Corresponding parts in the several figures are denoted by like characters of reference.

The side bars of the frame or chassis of the improved motor vehicle are each composed of a plurality of members $1^a$, $1^b$, $1^c$, which are connected together collapsibly or telescopically in order to enable said frame to be extended or collapsed at will; in the drawing these members have been shown as slides which are dovetailed together, but this precise construction need not be adhered to. The front members $1^a$ are connected together by the front cross bar 2, and the rear members $1^c$ are connected together by the rear cross bar 3, which latter has been shown as being provided with a handle 4 for convenience in extending and collapsing the frame. The front truck, which includes the front axle 5, front wheels 6, front members $1^a$ of the side bars of the frame and the front cross bar 2, supports the motor M having a driven shaft 7. Said front truck also supports the driver's seat 8. The rear truck which includes the rear axle 9, the hind wheels 10, the rear members $1^c$ of the side bars of the frame and the rear cross bar 3 may be variously spaced from the front truck, owing to the collapsible nature of the side bars of the frame or chassis; when the said frame is extended it may serve to support a receptacle, such as a wagon box or a hay rack 11, which will be positioned in rear of the driver's seat in such a manner that the load will be mainly supported on the hind axle. Stops, indicated at 12, are provided to limit the extension of the frame, and the frame when extended may be secured by fastening means of any suitable description, such as bolts 13 passing transversely through the slides. It is obvious that auxiliary bolt holes 14 may be provided to enable the frame to be secured at various adjustments so as to support receptacles of various dimensions.

The rear truck supports a counter shaft 15 having gears 16. It also supports a shaft 17. Motion is transmitted from the shaft 17 by means of a chain or link belt 18 to the rear axle 9 which is equipped in the customary manner with a differential gearing, the casing of which is indicated at 20.

The driven shaft 7 of the motor is provided with sprocket wheels 21 that may be connected by means of chains 22 with sprocket wheels 23 on the shaft 17. Such chains are preferably used for transmitting motion when the frame or chassis is extended. The driven shaft 7 is also provided with pinions 24 which, when the frame is collapsed, as shown in Fig. 2, will mesh with the gear wheels 16 on the shaft 15; said gear wheels being constantly in mesh with pinions 33 on the shaft 17 which will thus, when the frame is collapsed and the chains 22 have been detached, be driven by the motor in the same direction in which it will be driven through the medium of the chains 22 when the motor frame is extended.

Steering gear and other accessories of well known construction are to be provided, but have not been shown in detail, as they do not form part of the present invention.

From the foregoing description, taken in connection with the drawings hereto annexed, the operation of this invention will be readily understood. It will be seen that the motor vehicle when the frame is collapsed, as shown in Fig. 2, has an extremely short wheel base, making it convenient for handling and for making short turns, thereby adapting the vehicle to be conveniently and advantageously used as a farm tractor and for similar purposes. The frame or chassis may be very quickly and easily extended to support a wagon box or other receptacle, thus enabling the machine to be utilized for hauling hay, grain or other produce or commodities of any kind.

Having thus described the invention, what is claimed as new, is:—

A motor vehicle having an extensible and collapsible frame and including front and rear trucks with which the front and rear portions of said frame are associated, a motor supported in the front truck and having a diven shaft, a shaft supported transversely on the rear truck, a counter shaft also supported on the rear truck, intermeshing gears on the shaft and the counter shaft, means for transmitting motion from the shaft to the hind axle, means for transmitting motion from the driven shaft of the motor to the counter shaft of the hind truck when the frame is extended, and gear wheels on the driven shaft of the motor adapted to mesh with the gear wheels on the counter shaft of the rear truck when the frame is collapsed.

In testimony whereof I affix my signature in presence of two witnesses.

JAMES WESLEY BRUCE

Witnesses:
J. M. ADAIR,
J. G. BURKHART.